Sept. 14, 1943.  A. W. BULL ET AL  2,329,332
PNEUMATIC TIRE
Filed Dec. 31, 1940
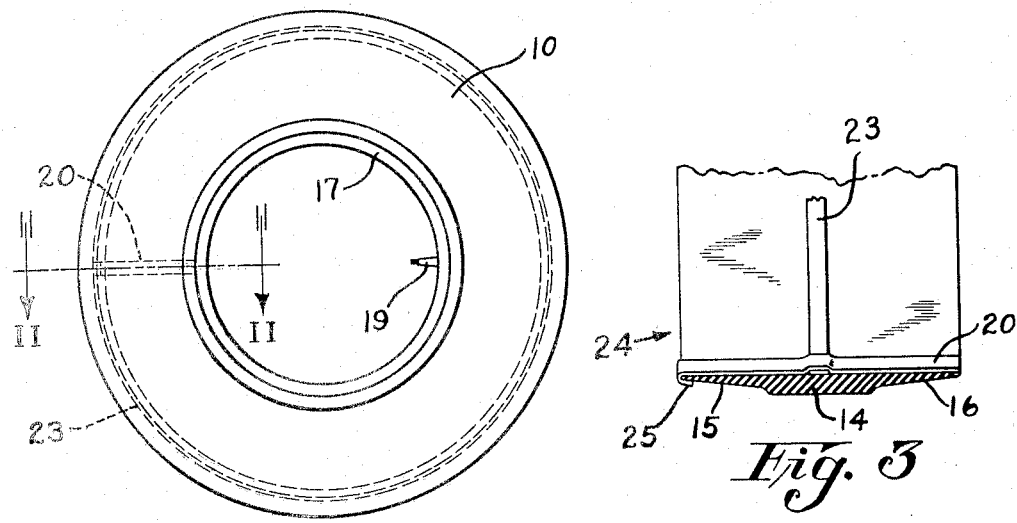
Fig. 1
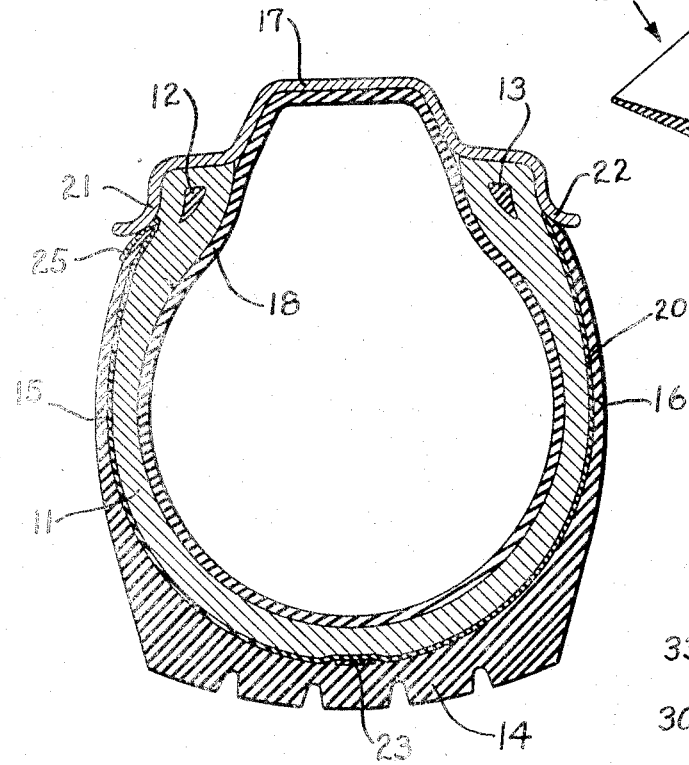
Fig. 2
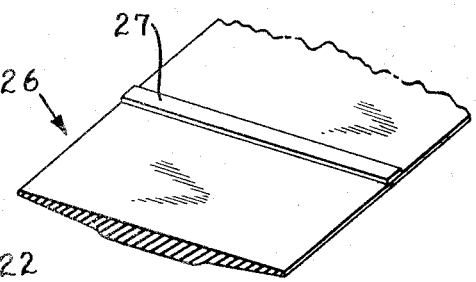
Fig. 3
Fig. 4
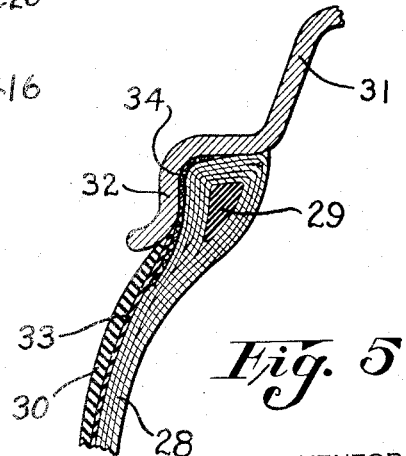
Fig. 5
INVENTOR
ARTHUR W. BULL
GLENN G. HAVENS
BY JOHN F. WILLIAMS
ATTORNEY Patented Sept. 14, 1943

2,329,332

UNITED STATES PATENT OFFICE 2,329,332

PNEUMATIC TIRE

Arthur W. Bull, Grosse Pointe, Glenn G. Havens, Detroit, and John F. Williams, Grosse Pointe, Mich., assignors to United States Rubber Company, New York, N. Y., a corporation of New Jersey Application December 31, 1940, Serial No. 372,544

7 Claims. (Cl. 152—330)

This invention relates to pneumatic tires and in particular, to pneumatic tires having electrically conducting characteristics.

It is generally recognized that static electricity is accumulated in automotive vehicles as the vehicle moves in relation to a roadway, and that the accumulated static discharges gradually through the tires to the ground. Static electricity is more pronounced and noticeable on present day automotive vehicles because of their higher speeds, quieter operation, and because the tires possess higher insulating characteristics. Among the objectionable features of the accumulation and discharge of static in automotive vehicles are annoyance of shock to passengers when touching the vehicle shortly after it comes to a stop, and radio interference. Another objectionable feature is the occurrence of sparks within the tire structure, resulting in the generation of ozone which is a detrimental influence associated with pneumatic tires.

In the practice of our invention, we have found a simple and efficient method of providing a path from the tire rim to the ground through which static may be discharged from the tire. This method consists generally of placing a thin ribbon of electrically conducting rubber composition transversely on the outer surface of the tire carcass and underneath the tread and sidewall rubber composition. In addition, a similar strip extends circumferentially of the tire between the carcass and the tread and contacts with the transverse strip.

It is recognized that the rubber composition of a pneumatic tire may be made conducting by incorporating in the rubber compound a sufficient quantity of electrically conducting carbon black; however, the presence in a rubber compound of a sufficient quantity of electrically conducting carbon black to render the composition adequately conductive produces a composition of inferior physical characteristics, such as poor abrasion resistance and the like. Incorporating ribbons of conducting rubber composition in a tire, according to the practice of our invention, has not been found to detract in any way from the high quality of tire performance.

Among the objects of our invention are to provide a pneumatic tire which incorporates a conducting path for discharging static electricity; to provide an efficient and economical method of obtaining an electrically conducting path in a tire; to provide a conducting path in a tire which does not interfere with the quality of the tire; to reduce or eliminate tube cracking due to the formation of ozone caused by an electrical static discharge; to eliminate static shock from automotive vehicles; and to improve radio performance. These and other objects and advantages appear more fully in the following detailed description when considered in connection with the accompanying drawing, in which:

Fig. 1 is a side elevational view of a pneumatic tire assembly embodying the features of our invention;

Fig. 2 is an enlarged transverse view thereof, in section, taken along section line II—II of Fig. 1;

Fig. 3 is a perspective view, in section, of a portion of a tread slab prior to its assembly with a tire carcass;

Fig. 4 is a perspective view, in section, of a portion of a tread slab illustrating a modified form of the invention; and Fig. 5 is a transverse view, in section, of a portion of a pneumatic tire and rim and illustrating a further modification of the invention.

With reference to the drawing and, in particular, to Figs. 1 and 2, we show a pneumatic tire 10, which, in most respects, is similar to a conventional pneumatic tire. The tire 10 includes a rubberized fabric carcass 11, inextensible beads 12 and 13, a tread 14 of rubber composition, and sidewall portions 15 and 16 also of rubber composition. The tire 10 is illustrated in mounted position on a drop center rim 17 and with an inner tube 18 assembled within the tire casing. A conventional valve stem 19 communicates with the inner tube 18. The rim 17, being formed of metal and associated directly or indirectly with the various other metallic components of an automotive vehicle, forms the nearest direct, metallic, electrically conducting path to the ground.

In order to decrease the conducting distance from the rim to the ground, we incorporate in the tire, between the tire carcass 11 and its tread 14 and sidewall portions 15 and 16, a strip or ribbon 20 of rubber composition compounded to render it electrically conducting. This ribbon 20 extends transversely of the tire so as to engage or contact both flanges 21 and 22 of the rim 17. We have found that good results can be obtained by providing a ribbon 20 of a width of about .5 inch and a thickness of .020 inch. Only a single strip extending transversely of the tire need be utilized, although it is to be understood that a plurality of strips may be employed, if desired. While we have shown the ribbon 20 extending from the flange 21 to the flange 22, it is to be understood that the purpose of the strip is to form a conducting path from the rim to the crown portion of the tire, and, therefore, it is necessary that the ribbon 20 engage only one of the flanges 21 or 22.

The ribbon is formed of a rubber composition containing a high percentage of electrically conducting carbon black. A type of carbon black particularly suitable for conducting purposes is acetylene carbon black. A preferred composition for the ribbon 20 is as follows:

|  | Parts by weight |
|---|---|
| Rubber | 100 |
| Acetylene carbon black | 50 |
| Zinc oxide | 4 |
| Stearic acid | 5 |
| Process oil (softener) | 10 |
| Accelerator | 1 |
| Sulfur | 3 |

In addition to the ribbon 20, a second ribbon 23 is located between the tread 14 and the carcass 11 at the crown region of the tire and extending circumferentially around the entire periphery of the tire. In so doing, this strip 23 engages and overlaps the transversely extending ribbon 20. The ribbon 23, in cross sectional dimensions and in material composition is the same as the ribbon 20. By the combination of the ribbons 20 and 23 an electrically conducting path is formed from the flanges of the tire rim to a line following the entire circumference of the tire underneath the tread. While this arrangement does not provide a direct electrical path from the rim to the ground or outer surface of the tread, it has been found that the electrical resistance of the tread is not sufficient to cause the retention of an appreciable static charge in the automotive vehicle. For example, the electrical resistance of the thickness of a convention tread such as the distance from the circumferential strip 23 to the outer surface of the tread 14 can be made less than about 1,000 megohms, whereas in a conventional tire the resistance from the tire rim to the ground usually exceeds 10,000 megohms, and often 100,000 megohms. Such a conducting path extending from the tire rim to the underside of the tread 14 provides a sufficient means such that a car will discharge the accumulated static by the time it is brought to a stop. At the same time the conducting path acts as a protective medium or shield which prevents or greatly reduces the detrimental influence of static sparks in or on the tire carcass.

The conducting ribbon 20, extending transversely of the tire, may be used alone or in combination with the circumferentially extending strip 23. When the conducting strip 20 is used by itself, the tire will discharge at the higest rate when its rotation brings the strip into close proximity with the ground or tire supporting surface. In such case the discharge of static will be of a periodic nature, in accordance with the rate of rotation of the tire. We have found that satisfactory results have been obtained by this method, except when treads of exceptionally high electrical resistance are used, because the transverse strips provided on each of the four tires of an automotive vehicle will, on an average, be located in such different positions that the static discharge will take place more frequently than once during the complete revolution of a single tire. The addition of the circumferential strip 23, however, should be made for treads of very high electrical resistance. Addition of this strip overcomes the periodic discharge condition, effecting a uniform and higher average rate of discharge.

Referring to Fig. 3, we show a tread slab 24 in its extruded shape prior to its application to a pneumatic tire. After the tread slab 24 is assembled with the tire and the tire is vulcanized, the tread slab is formed into a tire cover such as represented by the tread 14 and sidewall portions 15 and 16 of Fig. 2. While the tread is in slab form, as shown in Fig. 3, and after the strip 23 is applied to the tread slab, the strip 20 is easily and quickly applied to the top surface of the slab, the top surface being the surface which lies adjacent the tire carcass 11. Both the tread slab 24 and the conducting strip 20 are in their unvulcanized state when assembled; therefore, no cementing or other bonding operation is required. It is merely necessary to place the strip 20 in a substantially transverse position in relation to the tread slab to which it will readily adhere. Thereafter all of the tire building operations are in accordance with conventional practice and the thin strip 20 in no way interferes with subsequent operations. In order to insure proper contact of the transverse strip 20 with the flanges of a tire rim, one or both ends of the strip may be bent around the edge of the tread slab. For example, portion 25 of the strip 20 may be bent around the edge of the sidewall portion 15 of the slab so that the portion 25 lies on the opposite side of the tread slab. As indicated in Fig. 2, the over-lapped portion 25 lies in a position to make a good contact with the flange 21 of the rim 17.

As shown in Fig. 3, the circumferential strip 23 is applied to the top surface of the tread slab 24 while it is in an unvulcanized state and prior to assembly with the tire carcass. The strip 23 may be applied to the tread in a separate operation or it may be extruded simultaneously with the tread in a conventional dual extrusion method.

Fig. 4 illustrates a modification of the invention, showing a tread slab 26 with which is assembled a single transversely extending strip 27 of electrically conducting rubber composition. This modification merely shows that a transverse conducting strip may be used alone, that is, without association or contact with a circumferentially extending strip. The modification also shows that while it is preferable, it is not necessary to bend the end of the strip around the marginal edge of the tread slab. A tire having a tread slab and transverse strip, such as shown in Fig. 4, embodied in a tire assembly will correspond substantially to the right hand portion of the tire assembly shown in Fig. 2; the circumferentially extending strip 23 having been omitted therefrom.

A further modification of the invention is illustrated in Fig. 5, which shows a portion of a tire carcass 28, an inextensible bead element 29, and sidewall rubber composition 30. A portion only of the tire is shown mounted on a rim 31 provided with a flange 32. An electrically conducting, transversely extending strip 33 is interposed between the sidewall 30 and carcass 28 and follows the general assembly construction shown in the modification in Fig. 4. The only additional element included in Fig. 5 is the use of a fabric chafing strip 34. In conventional tire building practices it is customary to add a chafing strip of fabric to the outside of the tire bead portions as a protection to the tire bead fabric from abrasion which might result from its engagement with the tire rim flanges. Chafing strips are usually frictioned or otherwise coated with a rubber composition. In the practice of our invention, we provide a chafing strip 34 which is frictioned or coated with an electrically conducting rubber composition. The rubber composition employed in coating the chafing strip contains a relatively high per cent. of conducting carbon black such as acetylene carbon black. The conducting chafer insures an electrical contact with the rim flange throughout the life of the tire. The chafing strip 34 is applied to and forms a part of the carcass 28. Thereafter, as the tread is applied, the sidewall portion 30 overlaps the chafing strip 34 in part. The transversely extending conducting strip 33 lying on the inner surface of the tread wall 30 becomes firmly associated with the chafing strip 34. Thus, as the chafing strip lies in contacting engagement with the flange 32 of the rim 31, a good conducting path is formed between the rim 31 and the conducting strip 33.

From the foregoing description it is believed apparent that we have provided a novel and efficient method of forming a conducting path in pneumatic tires for the discharge of static electricity, and while we have shown and described a preferred embodiment of our invention, it is to be understood that it is susceptible of modifications as appearing within the spirit of the invention and the scope of the appended claims.

Having thus shown and described the invention, what we claim and desire to protect by Letters Patent is:

1. A pneumatic tire comprising a carcass of strain resisting elements, a tread and sidewall portions of rubber composition, a ribbon of electrically conducting rubber composition not more than several hundredths of an inch thick lying between the carcass and the tread and sidewall portions so that it is completely covered for the major portion of its length, the ends of said ribbon terminating at opposite bead regions of the tire, to thereby provide an electrical path from the bead portion to the tread portion of the tire.

2. A pneumatic tire comprising a carcass of strain resisting elements, a tread and sidewall portions of rubber composition, a ribbon of electrically conducting rubber composition not more than several hundredths of an inch thick lying between the carcass and the tread and sidewall portions so that it is completely covered for the major portion of its length, the ends of said ribbon terminating at opposite bead regions of the tire, one end portion of said ribbon being folded around the marginal edge of one of the sidewall portions, to thereby provide an electrical path from the bead portion to the tread portion of the tire.

3. A pneumatic tire comprising a carcass of strain resisting elements, a tread and sidewall portions of rubber composition, a ribbon of electrically conducting rubber composition not more than several hundredths of an inch thick lying between the carcass and the tread and sidewall portions and extending circumferentially of the tire at the crown portion thereof, and a transversely extending ribbon of electrically conducting rubber composition disposed between the carcass and sidewall portion so that it is covered by the latter and contacting with the circumferentially extending ribbon and terminating at the bead region of the tire, to thereby provide an electrical path from the bead portion to the tread portion of the tire.

4. A pneumatic tire comprising a carcass of strain resisting elements, a tread and sidewall portions of rubber composition, a ribbon of electrically conducting rubber composition not more than several hundredths of an inch thick lying between the carcass and the tread and sidewall portions and extending circumferentially of the tire at the crown portion thereof, a transversely extending ribbon of electrically conducting rubber composition disposed between the carcass and sidewall portion so that it is covered by the latter and contacting with the circumferentially extending ribbon and terminating at the bead region of the tire, an end portion of said transversely extending ribbon being folded around the marginal edge of one of the side wall portions, to thereby provide an electrical path from the bead portion to the tread portion of the tire.

5. A pneumatic tire comprising a carcass of strain resisting elements, a tread and sidewall portions of rubber composition, a chafing strip of fabric rubberized by the application of an electrically conducting rubber composition, a ribbon of electrically conducting rubber composition not more than several hundredths of an inch thick lying between the carcass and the tread and sidewall portions so that it is completely covered for the major portion of its length, the ends of said ribbon terminating at opposite bead regions of the tire in contact engagement with said chafing strip, to thereby provide an electrical path from the bead portion to the tread portion of the tire.

6. A pneumatic tire comprising a carcass of strain resisting elements, a tread and sidewall portions of rubber composition, a chafing strip of fabric rubberized by the application of an electrically conducting rubber composition, a ribbon of electrically conducting rubber composition not more than several hundredths of an inch thick lying between the carcass and the tread and sidewall portions and extending circumferentially of the tire at the crown portion thereof, a transversely extending ribbon of electrically conducting rubber composition disposed between the carcass and sidewall portion so that it is covered by the latter and contacting with the circumferentially extending ribbon and terminating at the bead region of the tire in contact engagement with said chafing strip.

7. A pneumatic tire comprising a carcass of strain resisting elements, a tread and sidewall portions of rubber composition, a chafing strip of fabric rubberized by the application of an electrically conducting rubber composition, a ribbon of electrically conducting rubber composition not more than several hundredths of an inch thick lying between the carcass and the tread and sidewall portions so that it is completely covered for the major portion of its length, the ends of said ribbon terminating at opposite bead regions of the tire in contact engagement with said chafing strip, an end portion of said transversely extending ribbon being folded arund the marginal edge of one of the sidewall portions.

ARTHUR W. BULL.
GLENN G. HAVENS.
JOHN F. WILLIAMS.